(12) United States Patent
Ko

(10) Patent No.: US 8,719,445 B2
(45) Date of Patent: May 6, 2014

(54) SYSTEM AND METHOD FOR LOAD BALANCING MULTIPLE FILE TRANSFER PROTOCOL (FTP) SERVERS TO SERVICE FTP CONNECTIONS FOR A CLOUD-BASED SERVICE

(71) Applicant: Yao Ko, San Jose, CA (US)

(72) Inventor: Yao Ko, San Jose, CA (US)

(73) Assignee: Box, Inc., Los Altos, CA (US)

( * ) Notice: Subject to any disclaimer, the term of this patent is extended or adjusted under 35 U.S.C. 154(b) by 0 days.

(21) Appl. No.: 13/649,784

(22) Filed: Oct. 11, 2012

(65) Prior Publication Data

US 2014/0012990 A1 Jan. 9, 2014

Related U.S. Application Data

(62) Division of application No. 13/565,136, filed on Aug. 2, 2012.

(60) Provisional application No. 61/667,909, filed on Jul. 3, 2012.

(51) Int. Cl.
*G06F 15/16* (2006.01)

(52) U.S. Cl.
USPC ............ 709/236; 709/229; 370/389

(58) Field of Classification Search
USPC ................................. 709/226
See application file for complete search history.

(56) References Cited

U.S. PATENT DOCUMENTS

| | | | |
|---|---|---|---|
| 5,799,320 A | 8/1998 | Klug | |
| 5,848,415 A | 12/1998 | Guck | |
| 5,999,908 A | 12/1999 | Abelow | |
| 6,034,621 A | 3/2000 | Kaufman | |
| 6,073,161 A | 6/2000 | DeBoskey et al. | |
| 6,233,600 B1 | 5/2001 | Salas et al. | |
| 6,289,345 B1 | 9/2001 | Yasue | |
| 6,292,803 B1 | 9/2001 | Richardson et al. | |
| 6,336,124 B1 | 1/2002 | Alam et al. | |
| 6,342,906 B1 | 1/2002 | Kumar et al. | |
| 6,345,386 B1 | 2/2002 | Delo et al. | |
| 6,385,606 B2 | 5/2002 | Inohara et al. | |

(Continued)

FOREIGN PATENT DOCUMENTS

| | | |
|---|---|---|
| CA | 2724521 | 11/2009 |
| EP | 1528742 A2 | 5/2005 |

(Continued)

OTHER PUBLICATIONS

Cisco, ("FTP Load Balancing on ACE in Routed Mode Configuration Example", DocWiki, Jun. 2011, all pages.*

(Continued)

*Primary Examiner* — Hua Fan
(74) *Attorney, Agent, or Firm* — Perkins Coie LLP

(57) ABSTRACT

System and method for load balancing multiple file transfer protocol (FTP) servers to service secure FTP sessions having encrypted signals are disclosed. In one aspect, embodiments of the system include multiple FTP servers coupled to a load balancing agent. Each of the multiple FTP servers is associated with a unique port range and the load balancer receives an encrypted data signal in a secure FTP session on a given port and uses a port range within which the given port falls to identify which of the multiple FTP servers a corresponding control signal of the secure FTP session was previously sent.

11 Claims, 8 Drawing Sheets

(56) References Cited

U.S. PATENT DOCUMENTS

| | | |
|---|---|---|
| 6,515,681 B1 | 2/2003 | Knight |
| 6,584,466 B1 | 6/2003 | Serbinis et al. |
| 6,636,872 B1 | 10/2003 | Heath et al. |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 7,010,752 B2 | 3/2006 | Ly |
| 7,039,806 B1 | 5/2006 | Friedman et al. |
| 7,069,393 B2 | 6/2006 | Miyata et al. |
| 7,133,834 B1 | 11/2006 | Abelow |
| 7,149,787 B1 | 12/2006 | Mutalik et al. |
| 7,152,182 B2 | 12/2006 | Ji et al. |
| 7,155,483 B1 | 12/2006 | Friend et al. |
| 7,222,078 B2 | 5/2007 | Abelow |
| 7,275,244 B1 | 9/2007 | Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,370,269 B1 | 5/2008 | Prabhu et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,650,367 B2 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,937,663 B2 | 5/2011 | Parker et al. |
| 7,958,453 B1 | 6/2011 | Taing |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,117,261 B2 | 2/2012 | Briere et al. |
| 8,140,513 B2 | 3/2012 | Ghods et al. |
| 8,185,830 B2 | 5/2012 | Saha et al. |
| 8,214,747 B1 | 7/2012 | Yankovich et al. |
| 8,230,348 B2 | 7/2012 | Peters et al. |
| 8,347,276 B2 | 1/2013 | Schadow |
| 8,358,701 B2 | 1/2013 | Chou et al. |
| 8,429,540 B1 | 4/2013 | Yankovich et al. |
| 8,464,161 B2 | 6/2013 | Giles et al. |
| 2001/0027492 A1* | 10/2001 | Gupta ............... 709/245 |
| 2002/0099772 A1 | 7/2002 | Deshpande et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0093404 A1 | 5/2003 | Bader et al. |
| 2003/0110264 A1 | 6/2003 | Whidby et al. |
| 2003/0135536 A1 | 7/2003 | Lyons |
| 2003/0135565 A1 | 7/2003 | Estrada |
| 2003/0204490 A1 | 10/2003 | Kasriel |
| 2004/0021686 A1 | 2/2004 | Barberis |
| 2004/0088647 A1 | 5/2004 | Miller et al. |
| 2004/0103147 A1 | 5/2004 | Flesher et al. |
| 2004/0111415 A1 | 6/2004 | Scardino et al. |
| 2004/0122949 A1 | 6/2004 | Zmudzinski et al. |
| 2004/0128359 A1 | 7/2004 | Horvitz et al. |
| 2004/0181579 A1 | 9/2004 | Huck et al. |
| 2004/0246532 A1 | 12/2004 | Inada |
| 2005/0005276 A1 | 1/2005 | Morgan |
| 2005/0022229 A1 | 1/2005 | Gabriel et al. |
| 2005/0050228 A1 | 3/2005 | Perham et al. |
| 2005/0063083 A1 | 3/2005 | Dart et al. |
| 2005/0114305 A1 | 5/2005 | Haynes et al. |
| 2005/0114378 A1 | 5/2005 | Elien et al. |
| 2005/0198299 A1 | 9/2005 | Beck et al. |
| 2005/0234943 A1 | 10/2005 | Clarke |
| 2005/0261933 A1 | 11/2005 | Magnuson |
| 2006/0026502 A1 | 2/2006 | Dutta |
| 2006/0036568 A1 | 2/2006 | Moore et al. |
| 2006/0041603 A1 | 2/2006 | Paterson et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0123062 A1 | 6/2006 | Bobbitt et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0259524 A1 | 11/2006 | Horton |
| 2006/0265719 A1 | 11/2006 | Astl et al. |
| 2006/0271510 A1 | 11/2006 | Harward et al. |
| 2007/0016680 A1 | 1/2007 | Burd et al. |
| 2007/0100830 A1 | 5/2007 | Beedubail et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0126635 A1 | 6/2007 | Houri |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0256065 A1 | 11/2007 | Heishi et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0046828 A1 | 2/2008 | Bibliowicz et al. |
| 2008/0059656 A1 | 3/2008 | Saliba et al. |
| 2008/0077631 A1 | 3/2008 | Petri |
| 2008/0104277 A1 | 5/2008 | Tian |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0183467 A1 | 7/2008 | Yuan et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0263099 A1 | 10/2008 | Brady-Kalnay et al. |
| 2008/0276158 A1 | 11/2008 | Lim et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0198772 A1 | 8/2009 | Kim et al. |
| 2009/0210459 A1 | 8/2009 | Nair et al. |
| 2009/0235167 A1 | 9/2009 | Boyer et al. |
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0271708 A1 | 10/2009 | Peters et al. |
| 2009/0276771 A1 | 11/2009 | Nickolov et al. |
| 2009/0300527 A1 | 12/2009 | Malcolm et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |

(56) References Cited

U.S. PATENT DOCUMENTS

| | | |
|---|---|---|
| 2010/0036929 A1 | 2/2010 | Scherpa et al. |
| 2010/0042720 A1 | 2/2010 | Stienhans et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0093310 A1 | 4/2010 | Gbadegesin et al. |
| 2010/0131868 A1 | 5/2010 | Chawla et al. |
| 2010/0151431 A1 | 6/2010 | Miller |
| 2010/0162365 A1 | 6/2010 | Del Real |
| 2010/0179940 A1 | 7/2010 | Gilder et al. |
| 2010/0185463 A1 | 7/2010 | Noland et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0223378 A1 | 9/2010 | Wei |
| 2010/0229085 A1 | 9/2010 | Nelson et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0257457 A1 | 10/2010 | De Goes |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0306379 A1 | 12/2010 | Ferris |
| 2010/0325155 A1 | 12/2010 | Skinner et al. |
| 2010/0325655 A1 | 12/2010 | Perez |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0047413 A1 | 2/2011 | McGill et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0119313 A1 | 5/2011 | Sung et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0202424 A1 | 8/2011 | Chun et al. |
| 2011/0202599 A1 | 8/2011 | Yuan et al. |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0219419 A1 | 9/2011 | Reisman |
| 2011/0238458 A1 | 9/2011 | Purcell et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0258561 A1 | 10/2011 | Ladouceur et al. |
| 2011/0282710 A1 | 11/2011 | Akkiraju et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0092055 A1 | 4/2012 | Peschke et al. |
| 2012/0117626 A1 | 5/2012 | Yates et al. |
| 2012/0124547 A1 | 5/2012 | Halbedel |
| 2012/0130900 A1 | 5/2012 | Tang et al. |
| 2012/0136936 A1 | 5/2012 | Quintuna |
| 2012/0150888 A1* | 6/2012 | Hyatt et al. .................. 707/758 |
| 2012/0151551 A1 | 6/2012 | Readshaw et al. |
| 2012/0158908 A1 | 6/2012 | Luna et al. |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203908 A1 | 8/2012 | Beaty et al. |
| 2012/0204032 A1 | 8/2012 | Wilkins et al. |
| 2012/0218885 A1 | 8/2012 | Abel et al. |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0240061 A1 | 9/2012 | Hillenius et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0309540 A1 | 12/2012 | Holme et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007245 A1 | 1/2013 | Malik et al. |
| 2013/0013560 A1 | 1/2013 | Goldberg et al. |
| 2013/0014023 A1 | 1/2013 | Lee et al. |
| 2013/0055127 A1 | 2/2013 | Saito et al. |
| 2013/0080919 A1 | 3/2013 | Kiang et al. |
| 2013/0138608 A1 | 5/2013 | Smith |
| 2013/0159411 A1 | 6/2013 | Bowen |
| 2013/0163289 A1 | 6/2013 | Kim et al. |
| 2013/0185347 A1 | 7/2013 | Romano |
| 2013/0191339 A1 | 7/2013 | Haden et al. |
| 2013/0262862 A1 | 10/2013 | Hartley |
| 2013/0268480 A1 | 10/2013 | Dorman |
| 2013/0275398 A1 | 10/2013 | Dorman et al. |
| 2013/0275429 A1 | 10/2013 | York et al. |
| 2013/0275509 A1 | 10/2013 | Micucci et al. |

FOREIGN PATENT DOCUMENTS

| | | |
|---|---|---|
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2004310272 A | 11/2004 |
| JP | 09-269925 | 10/2007 |
| JP | 2008250944 | 10/2008 |
| KR | 20020017444 A | 3/2002 |
| KR | 20040028036 | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2008011142 A2 | 1/2008 |
| WO | WO-2008076520 A2 | 6/2008 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |

OTHER PUBLICATIONS

Palmer, "Load Balancing FTP Servers", BlogNav, Oct. 2008, all pages.*
Wayback, "Wayback machine", wayback, Jun. 1, 2011, all pages.*
International Search Report and Written Opinion for PCT/US2008/

(56) References Cited

OTHER PUBLICATIONS 012973 dated Apr. 30, 2009, pp. 1-11.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/056472 mailed on Jun. 22, 2012, pp. 1-12.
International Search Report and Written Opinion for PCT/US2011/060875 Mailed Oct. 30, 2012, pp. 1-10.
Langfeld L. et al., "Microsoft SharePoint 2003 Unleashed," Chapters 11 and 15, Jun. 2004, pp. 403-404, 557-561, 578-581.
Partial International Search Report for PCT/US2011/041308 dated Feb. 27, 2012, pp. 1- 2.
Supplementary European Search Report European Application No. EP 08 85 8563 dated Jun. 20, 2011 pp. 1-5.
Internet Forums, http://web.archive.org/web/20100528195550/http://en.wikipedia.org/wiki/Internet_forums, Wikipedia, May 30, 2010, pp. 1-20.
Yahoo! Groups, http://web.archive.org/web/20090320101529/http://en.wikipedia.org/wiki/Yahoo!_Groups, Wikipedia, Mar. 20, 2009, pp. 1-6.
Wiki, http://web.archive.org/web/20100213004936/http://en.wikipedia.org/wiki/Wiki, Feb. 13, 2010, pp. 1-16.
Conner, "Google Apps: The Missing Manual," published by O'Reilly Media, May 27, 2008, 24 pages.
"Understanding Metadata," National Information Standards Organization, NISO Press, 2004, 20 pages.
International Search Report and Written Opinion for PCT/US2012/056955, Applicant: Box, Inc., Mailed Mar. 27, 2013, pp. 1-11.
International Search Report and Written Opinion for PCT/US2011/047530, Applicant: Box, Inc., Mailed Mar. 22, 2013, pp. 1-10.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2012/063041, Applicant: Box, Inc., Mailed Mar. 29, 2013, 12 pages.
International Search Report and Written Opinion for PCT/US2011/057938, Applicant: Box, Inc., Mailed Mar. 29, 2013, 10 pages.
Parr, "Google Docs Improves Commenting, Adds E-mail Notifications," Apr. 16, 2011, mashable.com, pp. 1-6.
"Microsoft Office SharePoint 2007 User Guide," Feb. 16, 2010, pp. 1-48.
Lars, "35 Very Useful Online Tools for Improving your project Management and Team Collaboration," Apr. 31, 2010, tripwiremagazine.com, pp. 1-32.
International Search Report and Written Opinion for PCT/US2010/070366, Applicant: Box, Inc., Mailed Mar. 24, 2013, 10 pages.
"How-to Geek, How to Sync Specific Folders With Dropbox," downloaded from the internet http://www.howtogeek.com, Apr. 23, 2013, 5 pages.
International Search Report and Written Opinion for PCT/US2013/020267, Applicant: Box, Inc., Mailed May 7, 2013, 10 pages.
International Search Report and Written Opinion for PCT/US2013/034662, Applicant: Box, Inc., Mailed May 31, 2013, 10 pages.
Exam Report for GB1306011.6, Applicant: Box, Inc. Mailed Apr. 18, 2013, 8 pages.
Exam Report for GB1300188.8, Applicant: Box, Inc. Mailed May 31, 2013, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
Exam Report for EP13158415.3, Applicant: Box, Inc. Mailed Jun. 4, 2013, 8 pages.
International Search Report and Written Opinion for PCT/US2013/029520, Applicant: Box, Inc., Mailed Jun. 26, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/035404, Applicant: Box, Inc., Mailed Jun. 26, 2013, 13 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1317600.3, Applicant: Box, Inc. Mailed Nov. 21, 2013, 8 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
International Search Report and Written Opinion for PCT/US2013/039782, Applicant: Box, Inc., Mailed Aug. 28, 2013, 15 pages.
Exam Report for EP13185269.1, Applicant: Box, Inc. Mailed Jan. 28, 7 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1316971.9, Applicant: Box, Inc. Mailed Nov. 26, 2013, 10 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
International Search Report and Written Opinion for PCT/US2013/034765, Applicant: Box, Inc., Mailed Jan. 20, 2014, 15 pages.
Patent Court Document of Approved Judgment for GB0602349.3 and GB0623571.7; Mar. 3, 2009, 17 pages.

\* cited by examiner

SYSTEM AND METHOD FOR LOAD BALANCING MULTIPLE FILE TRANSFER PROTOCOL (FTP) SERVERS TO SERVICE FTP CONNECTIONS FOR A CLOUD-BASED SERVICE

CROSS-REFERENCE TO RELATED APPLICATIONS

This application is a Divisional Application of U.S. patent application Ser. No. 13/565,136 entitled "LOAD BALANCING SECURE FTP CONNECTIONS AMONG MULTIPLE FTP SERVERS" which was filed on Aug. 2, 2012, which claims the benefit of U.S. Provisional Patent Application No. 61/667,909 entitled "HIGHLY AVAILABLE FTP SERVERS FOR A CLOUD-BASED SERVICE", which was filed on Jul. 3, 2012, the contents of which are all incorporated by reference herein.

BACKGROUND

Compatibility with FTP clients allows services to be available and compatible with existing infrastructures of existing clients and potential customers with infrastructure that rely on or utilize the FTP protocol. By further utilizing multiple FTP servers to support client or user needs, redundancy and automatic failover for an FTP server can be provided as an enhancement feature by removing a single point of failure.

However, the difficulty in load balancing a secure FTP session stems from the fact that it uses multiple TCP ports for a given session (e.g., one connection is for control whereas another connection is used for data transfer). While unencrypted or unsecured FTP packets in plain text can be inspected and the two connections can be paired up, encrypted or otherwise secure FTP connections cannot be matched for routing to the same backend FTP server. Some solutions for load balancers to handle secure FTP connections include requiring the hardware load balancer to terminate the SSL connection. However, this solution is highly un-scalable and can cause performance issues due to the workload imposed on the load balancers.

DETAILED DESCRIPTION

Figure 1:
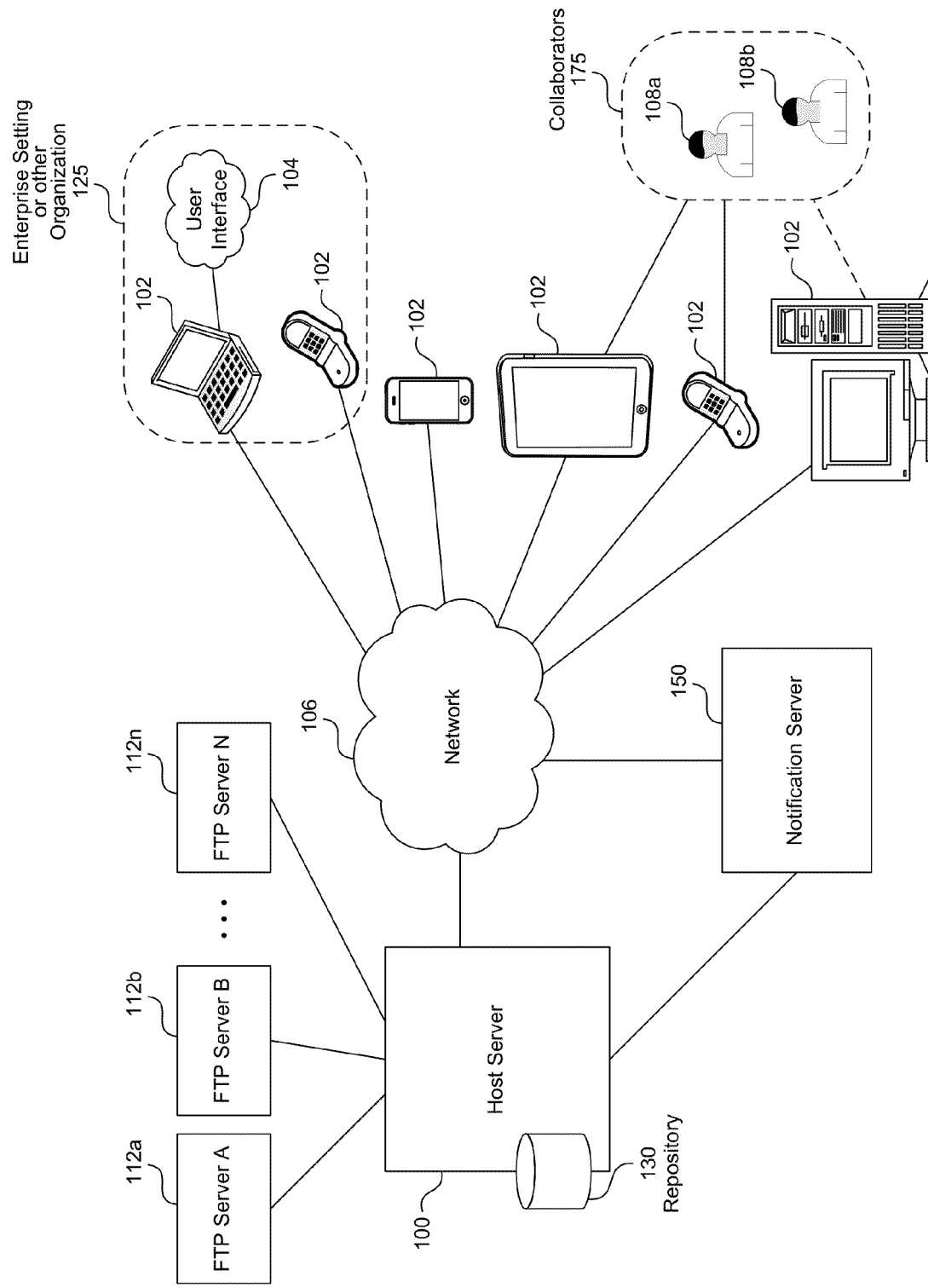
FIG. 1 illustrates an example diagram of a system having a host server of a cloud-enabled or cloud-based service such as a collaboration platform that is also able to handle secure FTP connection and load balance connections from multiple FTP clients among multiple FTP servers.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for load balancing secure FTP connections among multiple FTP servers.

FIG. 1 illustrates an example diagram of a system having a host server 100 of a cloud-enabled or cloud-based service such as a collaboration platform that is also able to handle secure FTP connection and load balance connections from multiple FTP clients among multiple FTP servers 112.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106 and/or a network 108. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
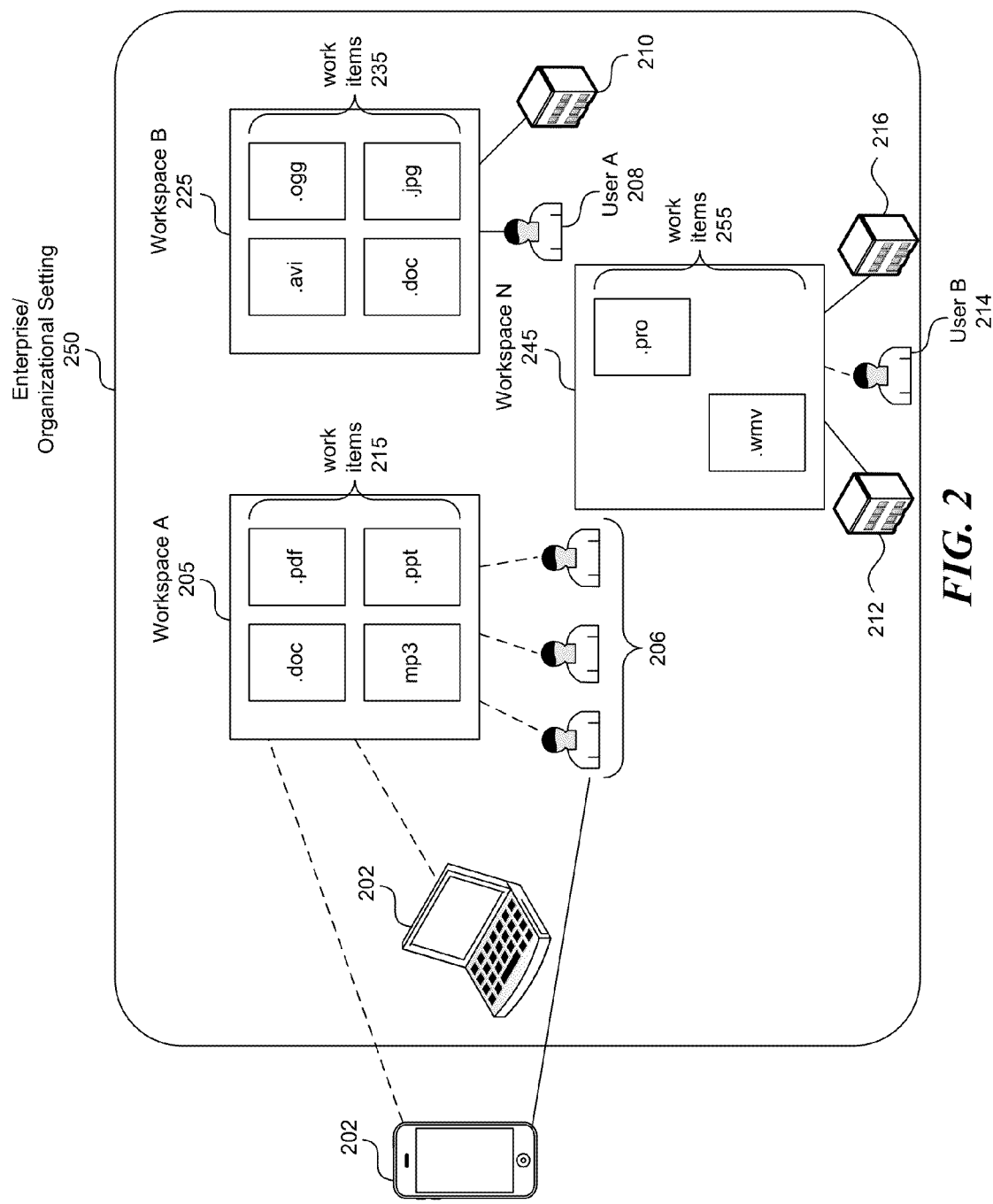
FIG. 2 depicts an example diagram of a web-based or online collaboration platform deployed in an enterprise or other organizational setting for organizing work items and workspaces.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, the host server 100 of the online or web-based collaboration environment includes user interface features which allow users to generate actionable events for task delegation and/or task management related to work items via a user interface having a discussion forum (e.g., by user devices 102). Specifically, the host server 100 enables creation and the delegation of action items relating to a work item to collaborator 175 via user devices 102 in an online collaboration environment via a unified user interface.

For example, a user can, in association with commenting on a work item or the status of a work item, also associate and/or generate action items (e.g., tasks including, for example, review, approve, update, edit, complete, work on, etc.) relating to one or more work items in the comment or otherwise using the same user interface for the commenting.

Functions and techniques disclosed for compatibility with clients 102 being FTP clients or relying wholly or in part on the FTP protocol for accessing functions/features of the host server 100 are further described with reference to the processes and architecture illustrated in the example of FIG. 4A-4B. Functions and techniques performed by the host server 100 and/or other related components therein are described, respectively, in detail with further reference to the example of FIG. 5.

In one embodiment, client devices 102 communicate with the host server 100 and/or notification server 150 over network 106. In general, network 106, over which the client devices 102, the host server 100, and/or notification server 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

FIG. 2 depicts an example diagram of a web-based or online collaboration platform deployed in an enterprise or other organizational setting 250 for organizing work items 215, 235, 255 and workspaces 205, 225, 245.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in a organizational setting, multiple workspaces (e.g., workspace A, B C) can be created to support different projects or a variety of work flows. Each workspace can have its own associate work items. For example, work space A 205 may be associated with work items 215, work space B 225 can be associated with work items 235, and work space N can be associated with work items 255. The work items 215, 235, and 255 may be unique to each work space but need not be. For example, a particular word document can be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 can be associated with departments 212 and 216 and users shown as example user B 214.

Each user associated with a work space can generally access the work items associated with the work space. The level of access will depend on permissions associated with the specific work space, and/or with a specific work item. Permissions can be set for the work space or set individually on a per work item basis. For example, the creator of a work space (e.g., one of user A 208 who creates work space B) can set one permission setting applicable to all work items 235 for other associated users and/or users associated with the affiliate department 210, for example. Creator user A 208 may also set different permission settings for each work item, which may be the same for different users, or varying for different users.

In each work space A, B ... N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, an upload of an edited or modified file.

In one embodiment, in a user interface to the web-based collaboration platform where notifications are presented, users can, via the same interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
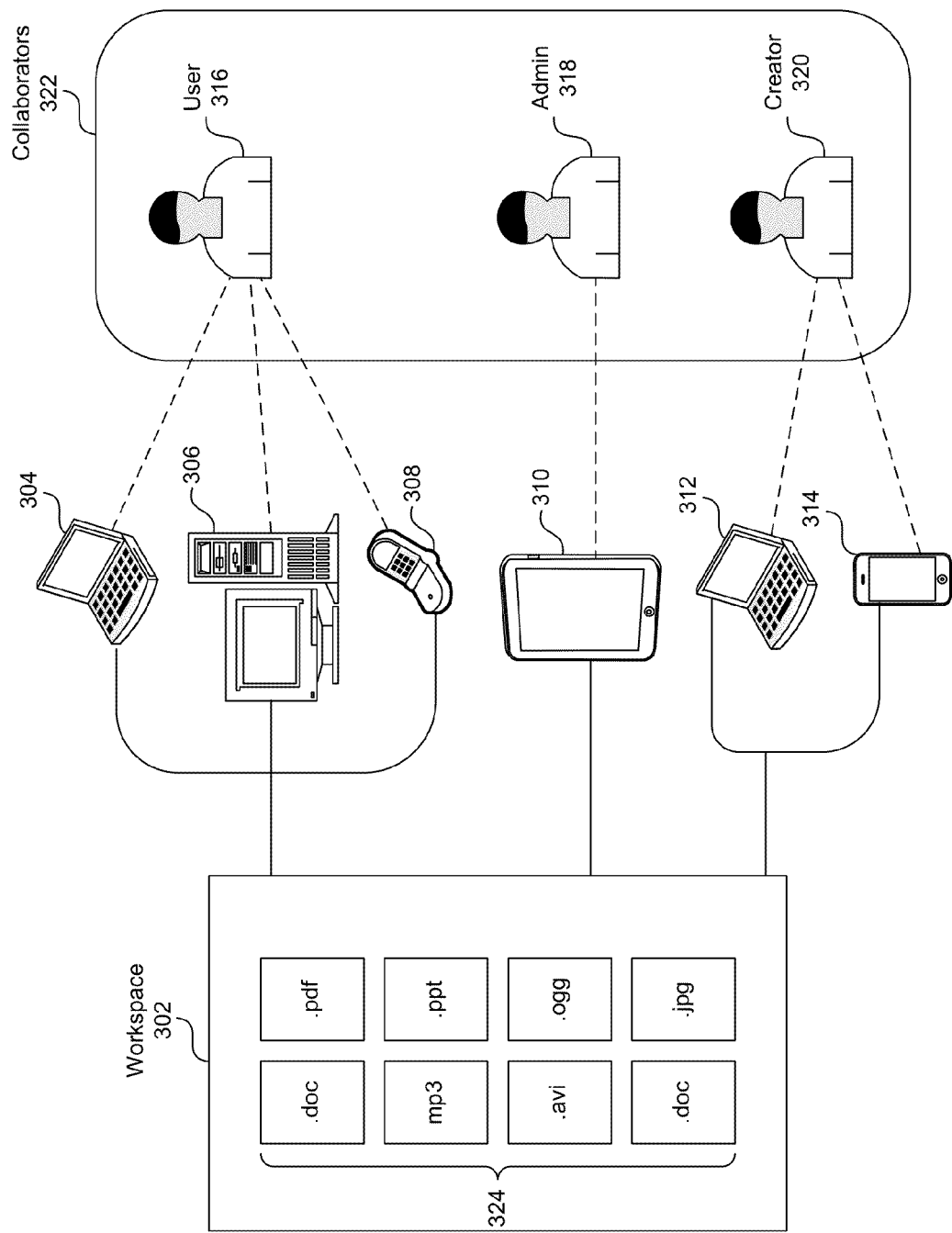
FIG. 3 depicts an example diagram of a workspace in an online or web-based collaboration environment accessible by multiple collaborators through various devices.

FIG. 3 depicts an example diagram of a workspace 302 in an online or web-based collaboration environment accessible by multiple collaborators 322 through various devices.

Each of users 316, 318, and 320 can individually use multiple different devices to access and/or manipulate work items 324 in the work space 302 with which they are associated with. For example users 316, 318, 320 can be collaborators on a project to which work items 324 are relevant. Since the work items 324 are hosted by the collaboration environment (e.g., a cloud-based environment), each user can access the work items 324 anytime, and from any physical location using any device (e.g., including devices they own or any shared/public/ loaner device).

Work items to be edited or viewed can be accessed from the workspace 302 in accordance with the platform and/or application independent mechanisms. Users can also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification can be depicted preferentially (e.g., ordering in the user interface) based on user preferences and/or relevance to the user (e.g., implicit or explicit).

For example, a notification of a download, access, read, write, edit, or uploaded related activities can be presented in a feed stream among other notifications through a user interface on the user device according to relevancy to the user determined based on current or recent activity of the user in the web-based collaboration environment.

In one embodiment, the notification feed stream further enables users to create or generate actionable events (e.g., as task) which are or can be performed by other users 316 or collaborators 322 (e.g., including admin users or other users not in the same work space), either in the same work space 302 or in some other work space. The actionable events such as tasks can also be assigned or delegated to other users via the same user interface.

For example, a given notification regarding a work item 324 can be associated with user interface features allowing a user 316 to assign a task related to the work item 324 (e.g., to another user 316, admin user 318, creator user 320 or another user). In one embodiment, a commenting user interface or a comment action associated with a notification can be used in conjunction with user interface features to enable task assignment, delegation, and/or management of the relevant work item or work items in the relevant work spaces, in the same user interface.

Figure 4A:
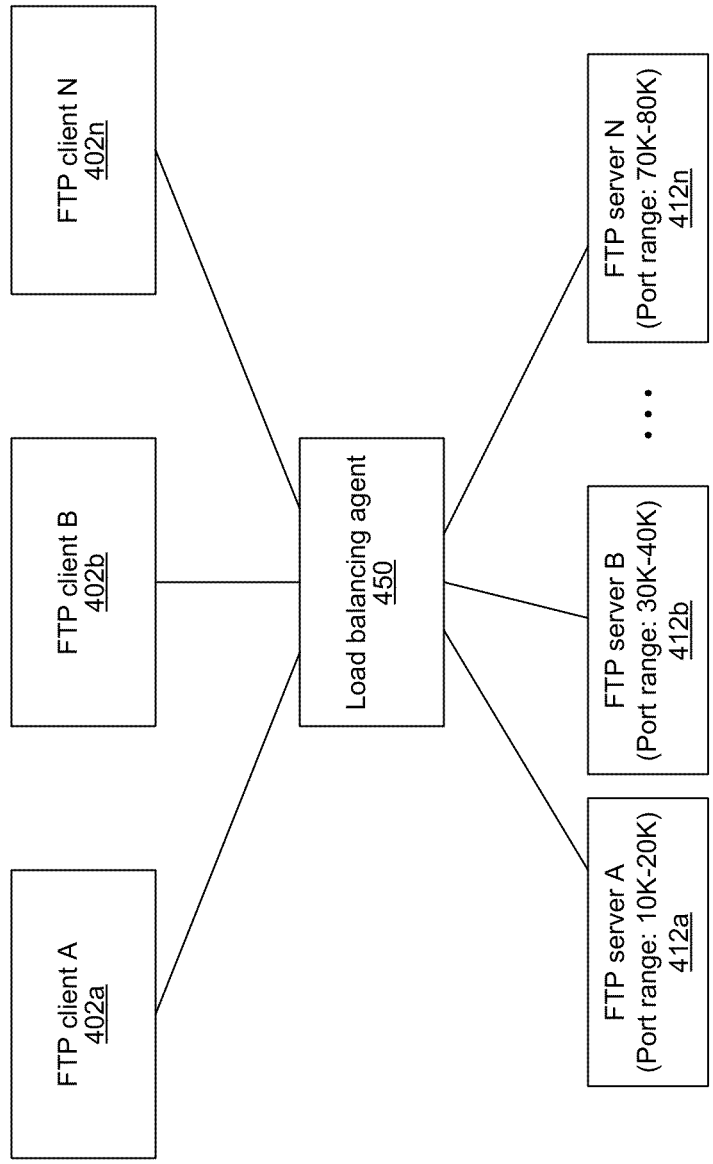
FIG. 4A depicts a block diagram illustrating an example architecture in which FTP connections can be load balanced among multiple FTP servers through the load balancing agent.

FIG. 4A depicts a block diagram illustrating an example architecture in which FTP connections from FTP clients 402 can be load balanced among multiple FTP servers 412 through the load balancing agent 450.

The load balancing agent 450 can be a component in the host server (e.g., the host server 100 or 500 in the examples of FIG. 1 and FIG. 5) or partially or externally coupled to the host server. The FTP clients 402A-N can be utilized at the client side (e.g., parts or all of clients 102 illustrated in the example of FIG. 1), to access services/the platform hosted by the host server 100. For example, one or more of the multiple FTP clients 402A-N are used for a collaborative environment deployed at a client site. Alternatively, the FTP clients A-N 402A-N can be integrated with existing hardware infrastructure of a client site, for example, a client which is utilizing a cloud-based service and/or a collaboration environment such as that illustrated and described in FIG. 2-FIG. 3 which can provide collaboration services and features for users at the client site.

In one embodiment, several FTP servers 412A-N can provide access to services (e.g., cloud-based services or a collaborative environment) to FTP clients 402A-N. The FTP servers 412A-N may also provide access to a web-accessible or web-based collaboration environment In one example architecture, the system for load balancing multiple file transfer protocol (FTP) servers to service FTP requests further includes a load balancing agent 450, described in further detail in FIG. 5.

In the example architecture, multiple FTP servers are coupled to the load balancing agent 450, which identifies an FTP server (e.g., FTP server A 412A) from the multiple FTP servers 412A-N to which to send a first signal of an FTP request. In response to the first signal, the FTP server (e.g., FTP server A 412a) that is selected can allocate a port within a port range and can identify the port as being available for use in connecting with the second signal of the FTP request. For example, FTP server A 412a can select or allocate port #1500 and return the port identifier (e.g., port number 1500) back to the load balancing agent 450 to return to the FTP client A 402a.

The FTP client A 402a then sends the second signal (e.g., data connection of the same FTP session) using the specified port (e.g., port #1500). The load balancing agent 450 can then receive the second signal of the FTP request on the specified port (e.g., port #1500) and uses the port range (e.g., between 10K-20K) within which a port number of the port falls to identify the FTP server (e.g., FTP server A) to which send the second signal of the FTP request, since the control and data signals of a given FTP session/request need to be routed to the same backend FTP server; in this case FTP server A 412a. The second signal of the FTP request can then be connected to the specific port (port 1500) allocated by the FTP server A 412A to complete the FTP request to the FTP server 412A.

In general, if the control signal and the data signal are already encrypted when the load balancing agent identifies the FTP server, then the port range can be used by the load balancing agent 450 or other intermediary to identify the FTP server (e.g., in this case FTP server A 412a) to which to route the second data connection in the event that the first and second signals of the FTP request are encrypted since in this situation, the load balancing agent 450 cannot analyze the messages and determine that they are from the same FTP session. In general, the first signal includes a control connection of the FTP request which utilizes a first TCP port and the second signal includes a data connection of the FTP request which utilizes a second TCP port.

Note that a given port range can uniquely associated with any given FTP server; for example, FTP server A 412a can be assigned to or associated with port range 10K-20K, FTP server B 412b with port range 30K-40K, . . . FTP server N with port range 70K-80K, etc. The different port range is used by the load balancing agent to identify the second FTP server to which to send the second signal of the other FTP connection. In one embodiment, the load balancing agent is associated with a virtual IP address for use in load balancing requests from multiple FTP clients among the multiple FTP servers.

When a different FTP request/connection is received by the load balancing agent 450, the load balancing agent 450 can assign the connection to another FTP server (e.g., FTP server B 412b). The other FTP server (e.g., server B 412b) of the multiple FTP servers can now identify an available port (e.g., port #3200) within a different port range (e.g., port range 30 k-40K) in response to receiving another FTP connection different from the load balancing agent 450. FTP server B specify the other port number (port #3200) associated with the available port to the load balancing agent 450 which responds to the FTP client which made the request.

In response the FTP client sends the data connection of the FTP session via port #3200. The load balancing agent 450 detects that port #3200 falls between port range 30 k-40 k which is associated with FTP server B 412b and routes the data connection to FTP server B to complete the FTP session.

Figure 4B:
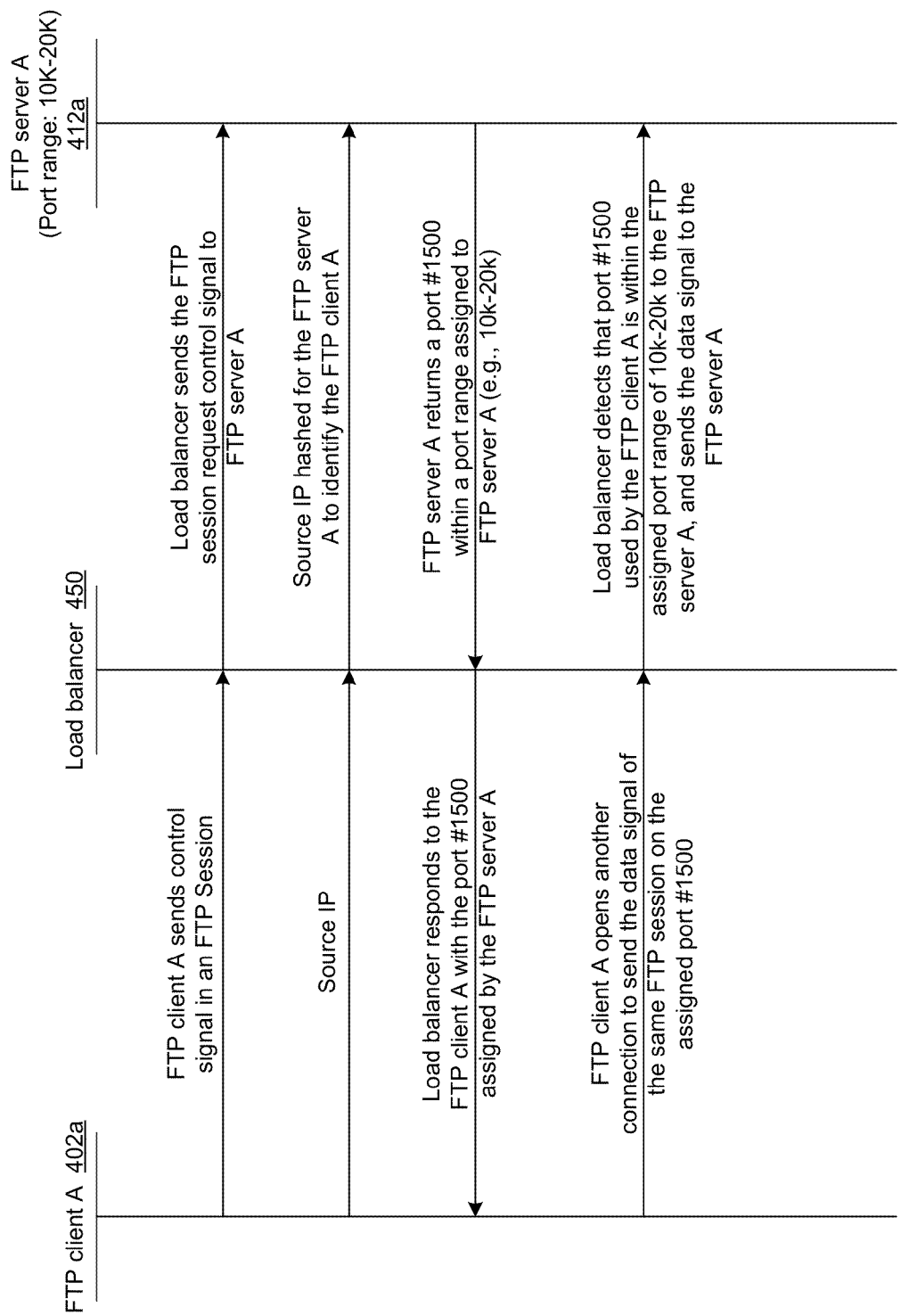
FIG. 4B depicts an interaction diagram between FTP client A, the load balancer and an FTP server A in connecting two different connections of a secure FTP session to the same backend FTP server A, when the signals are encrypted.

FIG. 4B depicts an interaction diagram showing signal exchanges between FTP client A 402a, the load balancer 450 and an FTP server A 412a in connecting two different connections of a secure FTP session to the same backend FTP server A 412a, when the signals are encrypted, to complete an FTP request.

Figure 5:
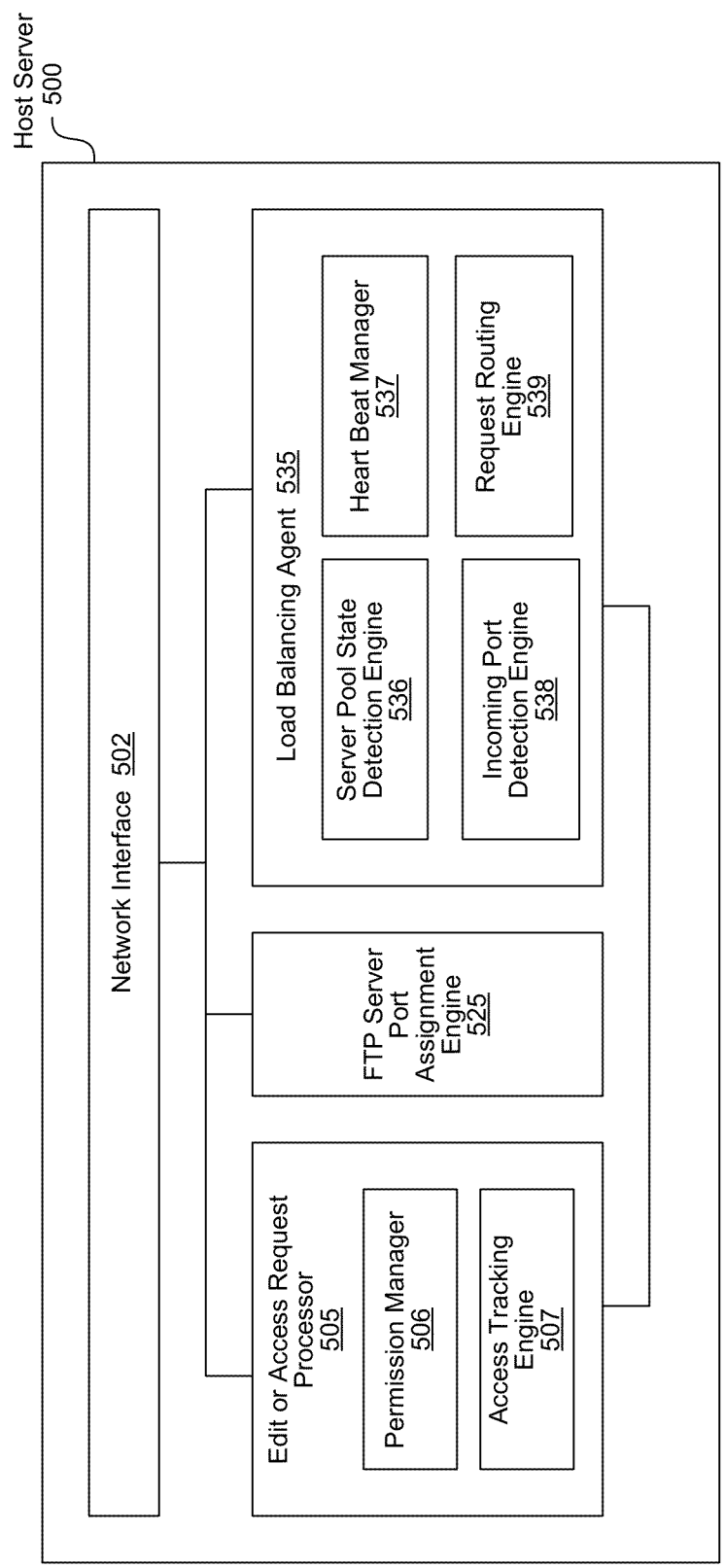
FIG. 5 depicts a block diagram illustrating an example of components in a host server able to handle secure FTP connection and load balance connections from multiple FTP clients among multiple FTP servers.

FIG. 5 depicts a block diagram illustrating an example of components in a host server 500 able to handle secure FTP connection and load balance connections from multiple FTP clients among multiple FTP servers.

The host server 500 of the web-based or online collaboration environment can generally be a cloud-based service. The host server 500 can include, for example, a network interface 502, an edit or access request processor 505 having a permission manager 506 and/or an access tracking engine 507, an FTP server port assignment engine 525, and/or a load balancing agent 535. The load balancing agent can include a server pool state detection engine 536, a heart beat manager 537, an incoming port detection engine 538 and/or a request routing engine 539. Additional or less components/modules/engines can be included in the host server 500 and each illustrated component.

The network interface 502 can be a networking module that enables the host server 500 to mediate data in a network with an entity that is external to the host server 400, through any known and/or convenient communications protocol supported by the host and the external entity. The network interface 502 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.,), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," a "processor," a "tracker," a "detector," a "generator," a "launcher," a "selector," an "updator," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 500 includes the edit or access request processor 505 which can receive, detect, process, identify, parse, translate, and/or determine a request from a user or user device to view, edit, modify, read, comment on, share, assign, generate actionable event, delegate task, or otherwise access a work item (e.g., file) stored on, managed by, or otherwise hosted by the host system 500. The request can be submitted from a user (e.g., through a user interface) to edit, view, comment, share, view, generate actionable event, assign task, or perform any other action on one or more files or work items stored on the host 500 (e.g., a host of a web-based or online collaboration platform).

The user can identify the files, content, or items to be accessed via the host server 500 one-by-one and queue up multiple items (e.g., including but not limited to files, folders, documents, images, audio, videos, or other media/multimedia content, etc.) to be accessed, viewed, or edited in a request. The user can also select one or more of the items to be accessed, and detected or managed by the edit/access request process 505. Using a drop down box or other user interface features in the web interface of the host server 500, e.g., via a button such as an 'edit' or 'download', or 'request' button in the user interface. In some instances, the 'edit' button may be disabled for selection when the file is locked (e.g., in use by another user) and unavailable for edit or for download to edit as a mechanism for version control. Alternatively, the user may be allowed to edit the file anyways but with a prompt warning that the file is in use and allowing the user to make the decision. In this case, the file may be edited but stored as a different version by the host server 500.

Responsive to detection of the request (e.g., by the edit/access request processor 505), user permission can initially be verified, for example, using the credentials submitted by the user (e.g., by the permission manager 506). The version control mechanisms can be performed for example, by the access tracking engine 507 to implement a process whereby only one user can edit one file at a given time, or implementation of multiple user edits, but using a method to track all edits with procedures in place for conflict resolution (e.g., by maintaining multiple copies either on the host server 500 and/or on respective user devices used by the multiple users).

In one embodiment, the request processor 505, in response to determining that the item at the host server 500 which requested for local access by a user on a user device, is not locked or in use by another user, is enabled for editing on the user device and can be downloaded remotely.

The permission manager 506 can, for example, provide a file to a first user for access at a first device of the first user's, using a first application which is available to the first user at the first device and providing the file to a second user for access at a second device of the second user's, using a second application which is available to the second user at the second device.

The permission manager 506 and/or the access tracking engine 507 allows both users and any additional users to edit/access, comment on the same file while managing potential conflicts, for example, by timing the edits and access so that changes from different users can be factored in, and/or keeping multiple versions of the same file and resolving conflicts if applicable. For example, the file can be provided to the first and second users and enabled for editing, commenting, or other types of access, at either the first device or the second device when the file is not locked or in use by the other party. In some instances, prior to providing the file to the first and second users, an authentication process is performed to verify or confirm access rights, for example, by the permission manager 506.

In the event that the access of host server services for collaboration, storage, sharing, and/or editing services are requested by FTP clients or via FTP sessions, the FTP management components of the host server 500 can be utilized. For example, the FTP server port assignment engine 525 can assign, update, re-assign, a unique port range to any or all FTP servers. The FTP servers, not illustrated in FIG. 5 but shown in FIG. 1 and FIG. 4A, can be distinct or separate from the host server (e.g., host server 100 or 500 of the examples of FIG. 1 and FIG. 5), or wholly or partially integrated into the host server 100 or 500.

The FTP server port assignment engine 525 generally assigns unique port ranges to different FTP servers such that individual FTP servers can be identified by a given port or port range (e.g., by the load balancing agent 535) when a connection is on a given port without additional server identifiers. The FTP server port assignment engine 525 can also assign port ranges with new FTP servers are added to the FTP server pool or reassign assignments when servers are removed or added, or make assignments/reassignments for other reasons.

The load balancing agent 535 can receive client requests that are FTP requests and can be used to intercept the FTP requests for load balancing requests among a pool of FTP servers. In some instances, the load balancing agent 535 may be bypassed if only one FTP server is being used or load balancing is not being performed, for any reason.

In general, when multiple FTP servers are used and load balancing is desired or needed, the FTP requests can be intercepted or received by the load balancing agent 535. The load balancing agent 535 determines the state of each FTP server in the server pool (e.g., server pool state detection engine 536) and connects the FTP request (e.g., usually the first control signal of a given FTP request/session) to the available or selected FTP server (e.g., via the request routing engine 539). The FTP server that is selected by the load balancing agent 535 can be based on server status, state, health, current/anticipated work load, location, as determined by the server pool state detection engine 536 and/or the heart beat manager 537. The heart beat manager 537 can utilize keep alive messages to determine/assess the health state of each of the FTP servers in use.

The FTP server, in response to receiving a control signal connection from the load balancing agent 535, returns a port identifier (e.g., a port number) to the load balancing agent 535. The load balancing agent 535 identifies the port to the FTP client such that the FTP client can use the port for the second data connection of the FTP session.

When the load balancing agent 535 receives the second data connection of the FTP session, the agent (e.g., via the incoming port detection engine 538) can use the port used by the second data connection to identify which of the FTP servers the first corresponding control connection was routed, since the two connections (data and control) of a given FTP session need to be routed to the same backend FTP server, and each FTP server is associated with a unique port range. The incoming port detection engine 538 can determine the port range within which the port utilized by the incoming data connection use the determine port range to identify the uniquely associated FTP server. The request routing engine 539 can then route the data connection to the thus identified FTP server.

Note that in one embodiment, the load balancing agent 535 is a clustered component with one or more load balancers. For example, the clustered configuration of the load balancing agent 535 can include at least two load balancers which can be in active or passive mode. When one of the load balancer dies or fails, the other load balancer can automatically take over, or another load balancer can be selected based on a selection or priority mechanism which may be capacity or location based. In one embodiment, the health status of the individual load balancers can be determined using a heart beat signal among each component in the load balancing cluster. Any number of load balancers can be in the clustered configuration of the load balancing agent 535.

Figure 6:
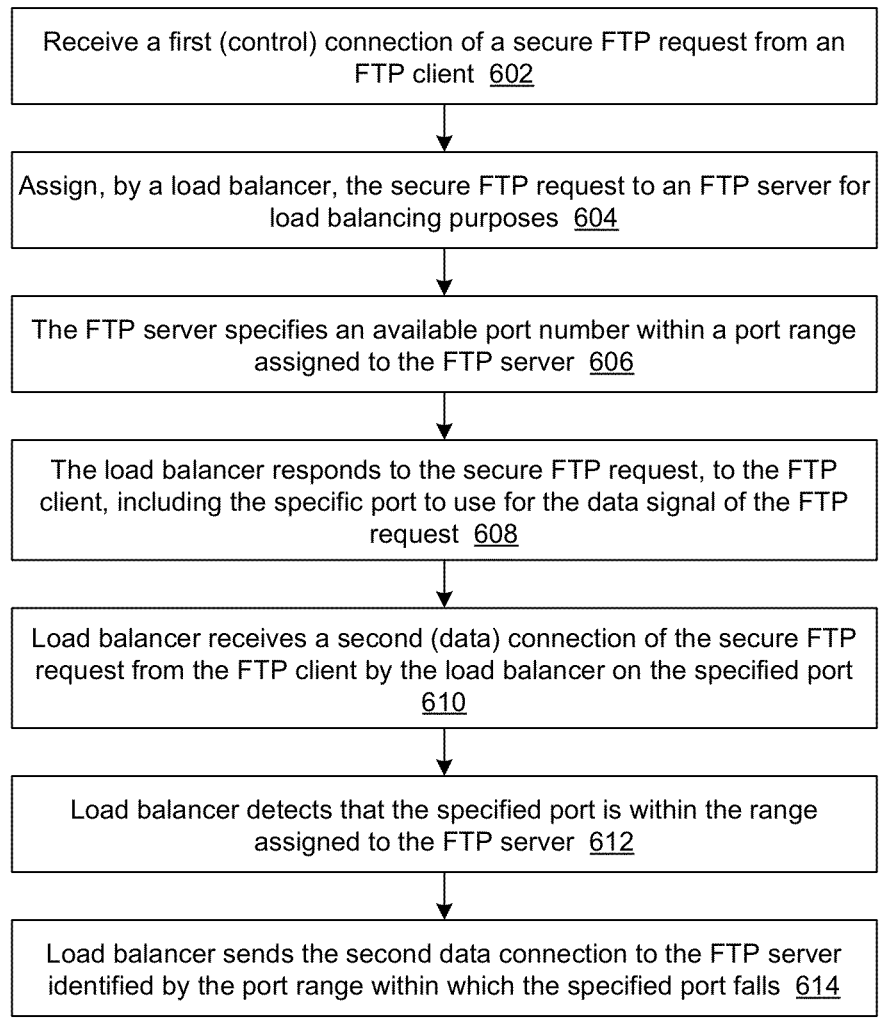
FIG. 6 depicts a flow chart illustrating an example process load balancing secure FTP connections among multiple FTP servers.

FIG. 6 depicts a flow chart illustrating an example process load balancing secure FTP connections among multiple FTP servers.

In process 602, a first (control) connection of a secure FTP request is received from an FTP client. In process 604, the secure FTP request is assigned to an FTP server for load balancing purposes and considerations. In process 606, the FTP server specifies an available port number within a port range assigned to or otherwise associated with the FTP server. In process 608, the load balancer responds to the secure FTP request to the FTP client. The response includes the specific port allocated or selected by the FTP server to use for the data (second) signal of the FTP request.

In process 610, the load balancer receives the second (data) connection or signal of the same secure FTP request from the FTP client by the load balancer on the specified port. In process 612, the load balancer detects that the specified port is within the range assigned to or associated with the FTP server. In process 614, the load balancer sends the second (data) connection from the FTP client to the FTP server identified by the port range within which the specified port falls. The secure FTP connections include encrypted control and data signals.

In the example of multiple FTP servers, a first FTP server returns a port within a port range uniquely associated with the first FTP server, in response to receiving a first connection of a secure FTP request. In one embodiment, the port range or the specific port is used to identify the first FTP server to send a second connection of the secure FTP request (e.g., by a load balancer or any other intervening server/agent/module).

A second FTP server, in response to receiving a first connection of another secure FTP request, returning, by a second FTP server, another port within a second port range uniquely associated with the second FTP server. In general, the second port range or the other specific port can be used to identify the second FTP server to send a second (e.g., data) connection of the other secure FTP request.

For load balancing among multiple FTP servers, the secure FTP request is received from a load balancing agent and the first FTP server to receive the secure FTP request can be selected by the load balancing agent. The FTP servers provide FTP client access to a cloud-based service or storage environment. In one embodiment, the FTP servers provide FTP client access to a web-accessible or web-based collaboration environment.

Figure 7:
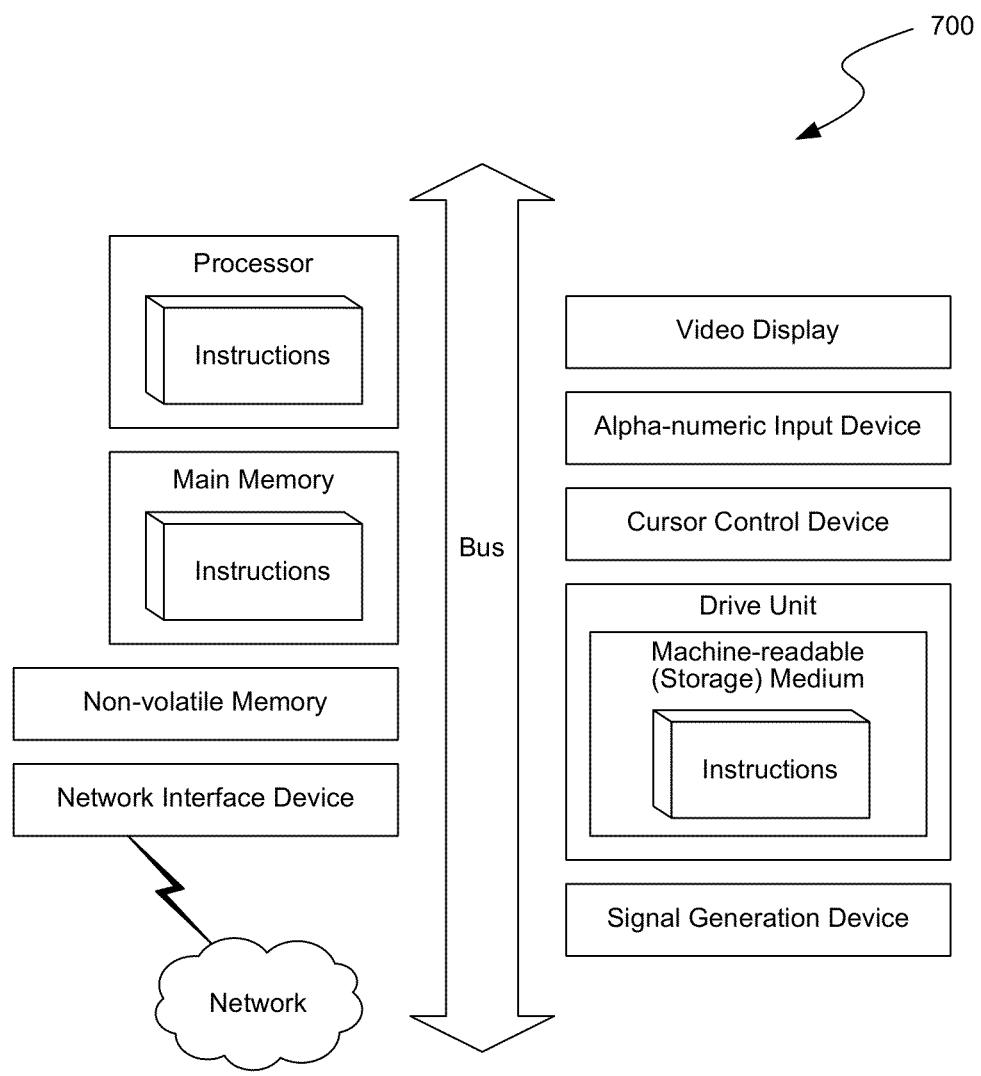
FIG. 7 shows a diagrammatic representation of a machine in the example form of a computer system within which a set of instructions, for causing the machine to perform any one or more of the methodologies discussed herein, may be executed.

FIG. 7 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 2800 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A system for load balancing multiple file transfer protocol (FTP) servers to service FTP connections for a cloud-based service, the system, comprising:
    a load balancing agent;
    multiple FTP servers coupled to the load balancing agent, which identifies an FTP server from the multiple FTP servers to which to send a control signal of an FTP connection;
    wherein, in response to the control signal, the FTP server, identifies a specific port within a port range and returns a port identifier to the specific port to the load balancing agent;
    wherein, the load balancer receives the data signal of the FTP connection on the specific port and uses the port range within which the specific port falls to identify the FTP server on which the control signal was sent;
    wherein, the load balancing agent is associated with a virtual IP address for use in load balancing requests from multiple FTP clients of the cloud-based service among the multiple FTP servers;
    wherein, the multiple FTP clients are integrated with existing hardware infrastructure of a client site utilizing the cloud-based service.

2. The system of claim 1, wherein, the load balancer sends the data signal of the FTP connection to the FTP server.

3. The system of claim 1, wherein, the control signal and the data signal are already encrypted when the load balancing agent identifies the FTP server.

4. The system of claim 1, wherein, the cloud-based service provides a cloud-based storage and file-sharing environment.

5. The system of claim 1, wherein, the cloud-based service provides collaboration services and features for users at the client site.

6. A method for load balancing secure FTP connections among FTP servers, the method, comprising:
    returning, by a first FTP server, a port within a port range uniquely associated with the first FTP server, in response to receiving a first connection of a secure FTP request;
    wherein, the port range or the specific port is used to identify the first FTP server to send a second connection of the secure FTP request;
    returning, by a second FTP server, another port within a second port range uniquely associated with the second FTP server, in response to receiving a first connection of another secure FTP request;
    wherein, the second port range or the other specific port is used to identify the second FTP server to send a second connection of the other secure FTP request;
    wherein, the FTP servers are integrated with infrastructure utilizing a cloud-based service.

7. The method of claim 6, wherein, the secure FTP request is received from a load balancing agent and the first FTP server to receive the secure FTP request is selected by the load balancing agent.

8. The method of claim 6, wherein, the first and second FTP servers are selected for load balancing considerations.

9. The method of claim 6, wherein, the secure FTP connections include encrypted control and data signals.

10. The method of claim 6, wherein, the FTP servers provide access to the cloud-based service or storage environment.

11. The method of claim 6, wherein, the FTP servers provide access to a web-accessible or web-based collaboration environment.

* * * * *